(12) United States Patent
Desjardins

(10) Patent No.: US 8,611,201 B2
(45) Date of Patent: Dec. 17, 2013

(54) VIBRATION-REDUCED TURNTABLE

(76) Inventor: Louis Desjardins, Promenade Normandie Ville Mont Royal (CA)

( * ) Notice: Subject to any disclaimer, the term of this patent is extended or adjusted under 35 U.S.C. 154(b) by 0 days.

(21) Appl. No.: 13/434,197

(22) Filed: Mar. 29, 2012

(65) Prior Publication Data
US 2012/0250489 A1 Oct. 4, 2012

Related U.S. Application Data

(60) Provisional application No. 61/468,934, filed on Mar. 29, 2011.

(51) Int. Cl.
*G11B 23/00* (2006.01)
*G11B 17/04* (2006.01)

(52) U.S. Cl.
USPC .......................... 369/263.1; 720/623; 720/604

(58) Field of Classification Search
USPC .......... 369/30.55, 30.85, 30.78, 30.77, 30.76, 369/30.87, 75.2, 53.18, 47.44, 263.1; 720/604, 690, 623, 661
See application file for complete search history.

(56) References Cited

U.S. PATENT DOCUMENTS

| 1,815,559 | A | 7/1931 | Garrigus |
| 1,950,693 | A | 3/1934 | Owens |
| 4,071,252 | A | 1/1978 | Gillespie |
| 4,106,776 | A | 8/1978 | Gillespie |
| 4,425,638 | A | 1/1984 | Suzuki et al. |
| 4,475,185 | A | 10/1984 | Fujio et al. |
| 4,553,230 | A | 11/1985 | Paulson |
| 5,798,999 | A | 8/1998 | Labinsky et al. |
| 6,532,204 | B1 | 3/2003 | Labinsky et al. |
| 6,741,536 | B1 * | 5/2004 | Ariyoshi et al. .............. 720/635 |
| 6,886,176 | B2 * | 4/2005 | Ariyoshi et al. .............. 720/661 |
| 7,055,156 | B2 * | 5/2006 | Chuang et al. ................ 720/604 |
| 7,057,992 | B2 * | 6/2006 | Obara ........................ 369/53.18 |
| 7,243,357 | B1 * | 7/2007 | Taniguchi et al. ............ 720/623 |
| 7,296,663 | B2 | 11/2007 | Spina |
| 7,316,303 | B2 | 1/2008 | Smith |

FOREIGN PATENT DOCUMENTS

EP 0259182 3/1988

* cited by examiner

*Primary Examiner* — Ali Neyzari
(74) *Attorney, Agent, or Firm* — Benoit & Côté Inc.

(57) ABSTRACT

The present document describes a vibration-reduced turntable adapted to receive a disc, the vibration-reduced turntable comprising: a frame; a first platter mounted on the frame and for receiving the disc, the first platter for rotation in a first direction; a second platter mounted on one of: the frame and the first platter, the second platter for rotation in a second direction; and a suspension system supporting the frame for reducing vibrations on the disc received by the first platter and for reducing vibrations of the frame.

20 Claims, 4 Drawing Sheets

VIBRATION-REDUCED TURNTABLE

CROSS-REFERENCE TO RELATED APPLICATIONS

This application claims priority under 35 USC §119(e) of U.S. provisional patent application 61/468,934 filed on Mar. 29, 2011, the specification of which is hereby incorporated by reference.

BACKGROUND (a) Field

The subject matter disclosed generally relates to a turntable. More specifically, the subject matter relates to a vibration-reduced turntable.

(b) Related Prior Art

Turntables are electromechanical systems used to extract musical signals cut as modulations into vinyl or shellac records (a.k.a. discs). As a system, a turntable typically consists of a platter and drive system, a tonearm, and a phono cartridge. The platter provides the rotational energy to the record placed upon it via the platter drive system, energy which the phono cartridge transducer, which is held above the record by the tonearm, needs to trace and to convert the modulations into electrical signals. These electrical signals are then amplified, re-equalized, and finally converted into musical sound-waves by loudspeakers. A key functional requirement of a turntable system is the consistency of the platters rotational velocity, especially when high level modulations, such as, without limitations, loud sounds, typically with low frequency content, provide greater friction to the phono transducer, creating a dynamic load on the platter drive system.

Turntables are extremely sensitive mechanical playback systems, and this makes it essential to reduce all external mechanical and electrical influences as much as possible.

One of the most critical components in any turntable design is the drive mechanism. At first glance, it appears to be a simple task to turn the platter at a constant 33⅓ or 45 RPM. In practice, it is extremely challenging to produce rotational speed that is sufficiently stable to prevent audible degradation of reproduced sound. Close examination of speed stability reveals a host of problems.

Micro speed variations are responsible for audible problems that most audiophiles would not attribute to the turntable drive mechanism. Harshness, muddiness and smearing are the classic symptoms of micro speed variations. In addition problems with a slow, dull presentation can often be traced to deficits in the turntable's drive mechanism.

Human hearing is remarkably sensitive to infinitesimally small errors in the time domain. This has been well documented in digital audio where timing errors (jitter) as small as ten trillionths of a second, have been shown to be detrimental to quality sound reproduction.

Well known prior art documents describe drive systems where a turntable and a motor for driving the turntable are directly coupled. In those systems, a record player is characterized in that a cancellation mechanism is disposed concentrically with the driving motor. The cancellation mechanism performs a reciprocating rotational motion to generate a torque equal in magnitude and reverse in direction with respect to a torque fluctuation developed by rotation of the driving motor. The system thereby cancels the counteractive rotational vibrations exerted on a frame of the record player. However, these systems do not provide an optimized reduction of external mechanical and electrical influences.

There is therefore a need for an improved vibration-reduced turntable allowing an important reduction of the external mechanical and electrical influences.

SUMMARY

According to an embodiment, there is provided a vibration-reduced turntable adapted to receive a disc, the vibration-reduced turntable comprising: a frame; a first platter mounted on the frame and for receiving the disc, the first platter for rotation in a first direction; a second platter mounted on one of: the frame and the first platter, the second platter for rotation in a second direction; and a suspension system supporting the frame for reducing vibrations on the disc received by the first platter and for reducing vibrations of the frame.

According to another embodiment, the first platter and the second platter are concentric.

According to another embodiment, the first platter and the second platter are in parallel planes.

According to another embodiment, the vibration-reduced turntable further comprises a base on which the suspension system is mounted.

According to another embodiment, the frame further comprises a support plate for supporting at least one of the first platter and the second platter.

According to another embodiment, the support plate comprises two support plates, each one of the two support plates for supporting a respective one of the first platter and the second platter.

According to another embodiment, a shape of the first platter and a shape of the second platter are included in the group consisting of: a disk-shape, a polygonal-shape, a square-shape, an oval-shape, a longitudinal-shape, an irregular-shape, a regular-shape or a combination thereof.

According to another embodiment, the first platter and the second platter are of a different shape.

According to another embodiment, the vibration-reduced turntable further comprises a drive unit for rotating the first platter in the first direction and the second platter in the second direction.

According to another embodiment, the drive unit comprises an electric motor.

According to another embodiment, the drive unit comprises two electric motors, a first one of the two electric motors for rotating the first platter in the first direction and a second one of the two electric motors for rotating the second platter in the second direction.

According to another embodiment, the vibration-reduced turntable further comprises a base and wherein the drive unit is mounted to the base.

According to another embodiment, the drive unit comprises a first drivebelt and a second drivebelt, wherein the first platter and the second platter are driven into rotation using respectively the first drivebelt and the second drivebelt.

According to another embodiment, the first drivebelt has a first end set around the first platter and another first end set around a first output pulley of the drive unit and the second drivebelt has a second end set around the second platter and another second end set around a second output pulley of the drive unit.

According to another embodiment, the first platter is above the second platter.

According to another embodiment, the vibration-reduced turntable is for installation on a surface and wherein the suspension system further comprises a post and a biasing device.

According to another embodiment, the biasing device comprises a spring.

According to another embodiment, the suspension system further comprises a suspension arm unit and wherein one of the post and the suspension arm unit is mounted to the frame while the other one of: the post and the suspension arm unit is for interfacing with the surface and further wherein the biasing device is the interface between the post and the suspension arm unit.

According to another embodiment, the post comprises at least two posts and the suspension arm unit comprises at least two suspension arm units, each suspension arm unit corresponding to one of the at least two posts.

According to another embodiment, the biasing device comprises an elastic ring.

Features and advantages of the subject matter hereof will become more apparent in light of the following detailed description of selected embodiments, as illustrated in the accompanying figures. As will be realized, the subject matter disclosed and claimed is capable of modifications in various respects, all without departing from the scope of the claims. Accordingly, the drawings and the description are to be regarded as illustrative in nature and not as restrictive and the full scope of the subject matter is set forth in the claims.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENTS

In embodiments described herein, there is disclosed a vibration-reduced turntable adapted to receive a disc. More specifically, there is disclosed a vibration-reduced turntable having a suspension system and a second platter for rotating in an opposite direction of a first platter, allowing an important reduction of the external mechanical and electrical influences.

Figure 1:
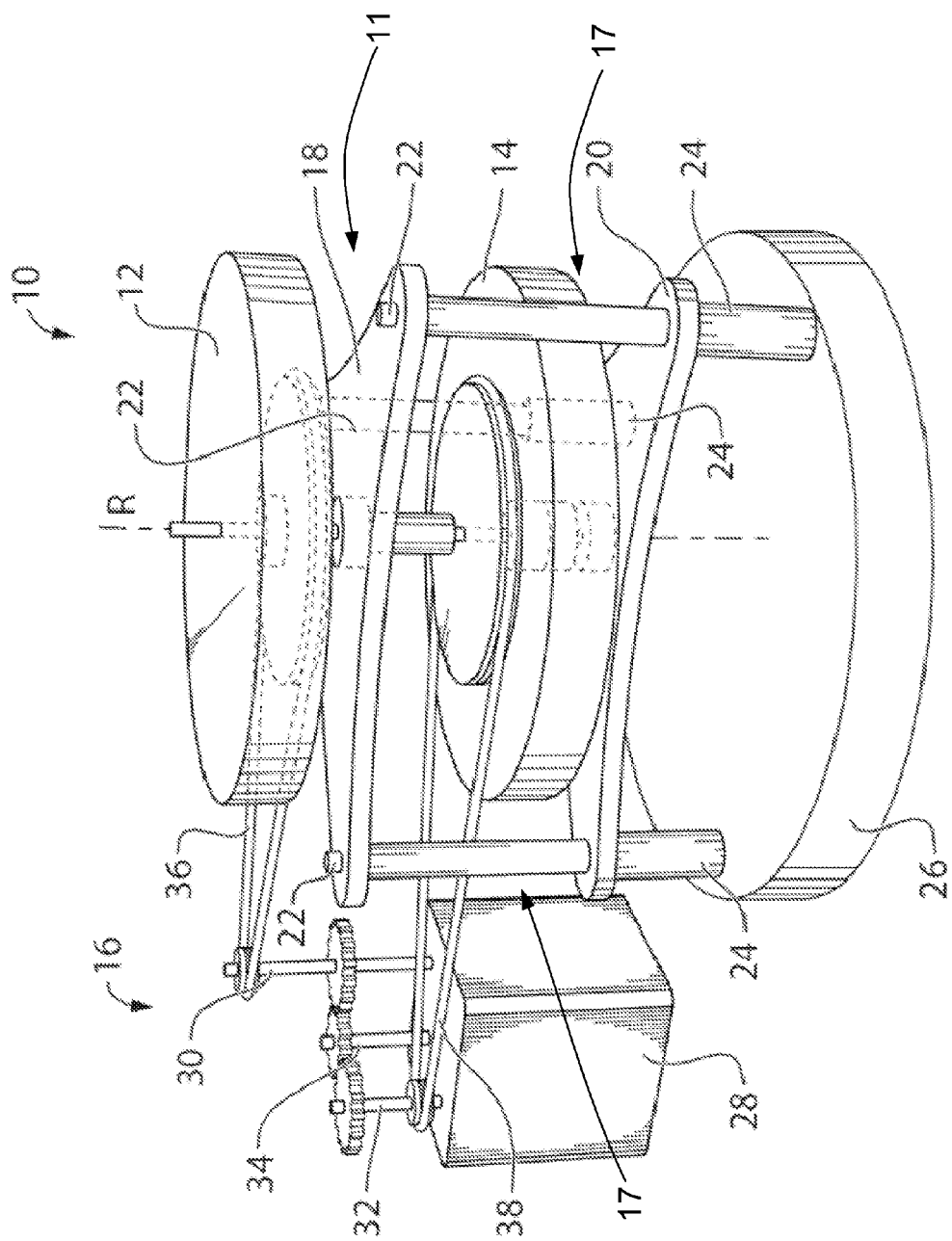
FIG. 1 is a perspective exploded view of a vibration-reduced turntable according to an embodiment.
Figure 2:
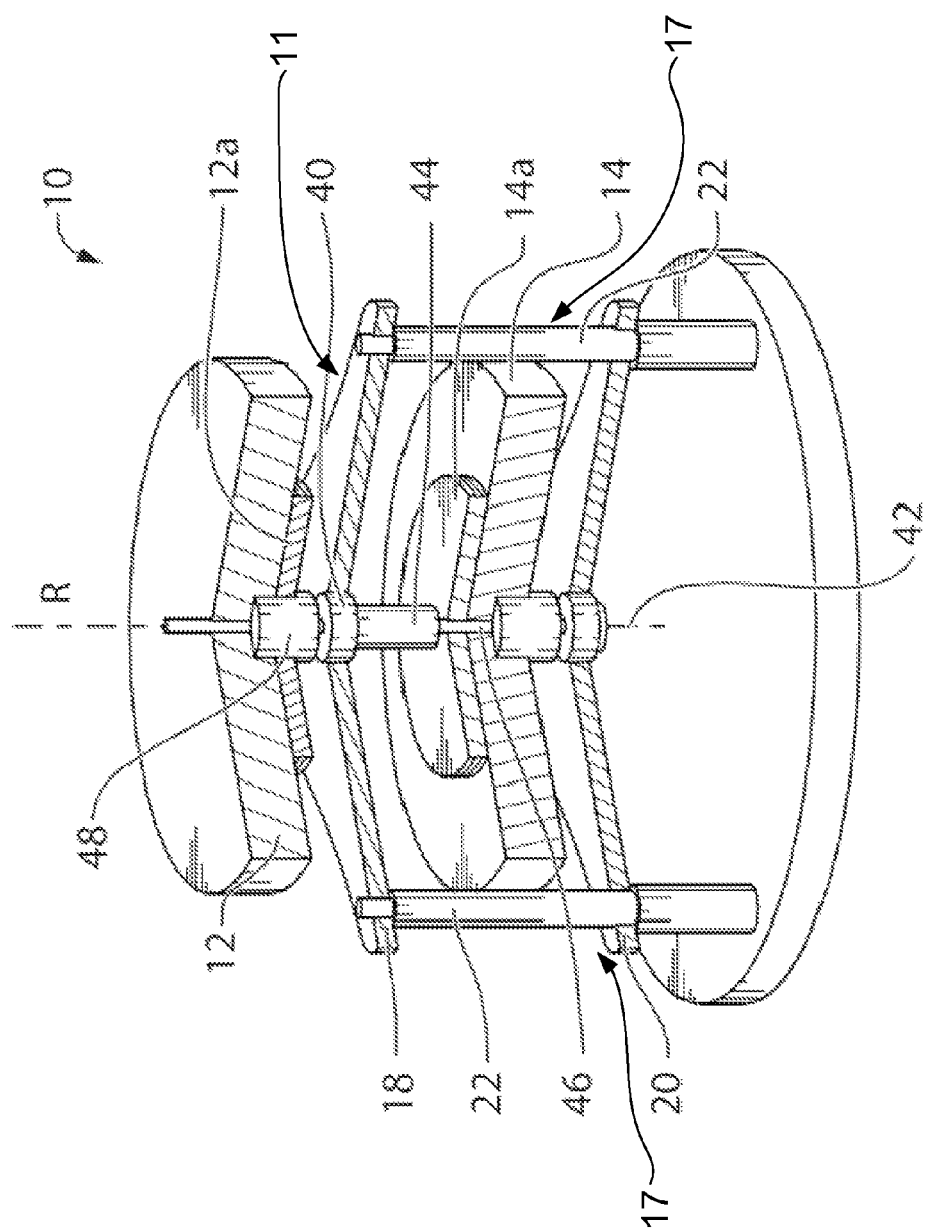
FIG. 2 is a cross-sectional view of the vibration-reduced turntable of FIG. 1.

Referring now to the drawings, and more particularly to FIGS. 1 and 2, there is shown a vibration-reduced turntable 10 adapted to receive a disc (not shown), in accordance with an embodiment. The vibration-reduced turntable 10 includes a frame 11 and a first platter 12 mounted on the frame 11, where the first platter 12 is for receiving the disc. It is to be noted that the first platter 12 rotates in a first direction. The vibration-reduced turntable 10 also includes a second platter 14, which is mounted on the frame 11. Although the second platter 14 on FIG. 1 is shown to be mounted on the frame 11, it is possible for the second platter 14 to be mounted on one of the first platter 12 and the frame 11. The second platter 14 rotates in a second direction, which corresponds to the opposite direction of the first direction. Moreover, the first platter 12 and the second platter 14 of the vibration-reduced turntable 10 are concentric. According to different embodiment, although FIG. 1 shows the first and second platters 12, 14 being concentric, it is possible for the first and second platters 12, 14 to be non-concentric. For instance, the first and second platters 12, 14 may be positioned side by side on the frame 11, since the first platter 12 and the second platter 14 rotate in opposite direction. The vibration-reduced turntable 10 of FIG. 1 also includes a suspension system 17 for supporting the frame 11. The suspension system 17 enables the reduction of vibrations on the disc received by the first platter and also enables the reduction of vibrations of the frame. It is also to be noted that the first and second platters 12, 14 may rotate on the same shaft (not shown) or that the first and second platters 12, 14 may rotate on different shafts 48, 49 (FIG. 2) around a rotation axis R.

Still referring to FIGS. 1 and 2, the vibration-reduced turntable 10 includes two identical disk-shaped platters respectively corresponding to the first platter 12 and the second platter 14 that are concentrically-disposed and driven into rotation around the rotation axis R. The first platter 12 and the second platter 14 may be driven in rotation by a drive unit 16, which may be located on the side of the first platter 12 and the second platter 14. The first platter 12 receives the record to be played and the first and second platters 12, 14 rotate in opposite direction when the drive unit 16 is powered. It is to be noted that the drive unit 16 may be connected to the frame 11 of the vibration-reduced turntable 10.

In some embodiments, the first platter 12 and the second platter 14 may not have the same shape. The shape of the first platter 12 and of the second platter 14 may be, without limitation, a disk-shape, a polygonal-shape, a square-shape, an oval-shape, a longitudinal-shape, an irregular shape, a regular shape or any combination of those shapes.

In some embodiments, the vibration-reduced turntable 10 may include two drive units (not shown), a first drive unit corresponding to the first platter 12 for driving the first platter 12 and a second drive unit corresponding to the second platter 14 for driving the second platter 14.

In another embodiment, the second platter 14 may receive the record to be played, although FIGS. 1 and 2 illustrate the first platter 12 being above the second platter 14.

Still referring to FIGS. 1 and 2, the weights of the first and second platters 12, 14 are supported by two corresponding support plates 18, 20. Each support plate 18, 20 is rigidly attached to a plurality of vertical posts 22 (three in the illustrated example of FIGS. 1 and 2) surrounding the outer periphery of the first and second platters 12, 14. Each vertical post 22 has a corresponding suspension arm unit 24 connected to a base 26 of the vibration-reduced turntable 10. A biasing device (not shown) supports vertical posts 22 and acts as the interface between the vertical posts 22 and the suspension arm units 24. The biasing device permits up and down movement of the rotation portion of the vibration-reduced turntable 10 thereby isolating the frame 11 from a surface on which the vibration-reduced turntable 10 would be installed. While the vibration-reduced turntable 10 is shown to be installed on a horizontal surface by resting it thereon, it is envisaged that in other embodiments, the vibration-reduced turntable 10 could be suspended from a horizontal surface or arm.

The drive unit 16 comprises one electric motor 28 and two output pulleys 30, 32. The connection between the output shaft of the electric motor 28 and the output pulleys 30, 32 can include a set of gears 34. It is to be noted that the drive unit 16 may further include two separate electric motors (not shown), each one corresponding to output pulleys 30, 32.

Additionally, the first and second platters 12, 14 are driven into rotation using corresponding drive belts 36, 38. The first drivebelt 36 has one first end 90 set around a drive surface of a smaller-diameter portion 12a (see FIG. 2) juxtaposed under the top first platter 12 and another first end 91 set around the first output pulley 30 of the drive unit 16. Likewise, the second drivebelt 38 has one second end 92 set around a drive surface of a smaller-diameter portion 14a juxtaposed above the main portion of the bottom second platter 14 and another second end set around the second output pulley 32 of the drive unit 16. Alternatively, the drive surface on each platter 12, 14 can also be the side surface of the larger-diameter portions. Each output pulley 30, 32 is substantially disposed in the same horizontal plane as that of the corresponding platter portion 12a, 14a.

It should be noted that the gears 34 of the drive unit 16 are designed to rotate the two output pulleys 30, 32 at the exact same rotational speed but in opposite directions. This way, the first and second platters 12, 14 will always be synchronized since the transmission ratio between each output pulley 30, 32 and its corresponding first or second platter 12, 14 is the same.

The first drivebelt 36 of the vibration-reduced turntable 10 has a first end 90 set around the first platter 12 and another first end 91 set around a first output pulley 30 of the drive unit 16 and the second drivebelt 38 has a second end 92 set around the second platter 14 and another second end 93 set around a second output pulley 32 of the drive unit 16. It is to be noted that the second platter 14 of the vibration-reduced turntable 10 may be configured to receive the disc (as well as or instead of the first platter 12).

Also, the vibration-reduced turntable 10 may be for resting on a surface and the suspension system 17 comprises a vertical post 22 and a biasing device (not shown). The biasing device may include a spring, a suspension mechanism or any suitable equivalent interface. The suspension system 17 also includes a suspension arm unit 24. One of the vertical post 22 and the suspension arm unit 24 may be mounted to the frame 11 while the other one of the vertical posts 22 and the suspension arm unit 24 is for interfacing with the surface. The biasing device is the interface between the vertical post 22 and the suspension arm unit 24 and the biasing device may comprise an elastic ring.

According to another embodiment, and referring to FIG. 1, for allowing the first and second platters 12, 14 to rotate in different directions, the drive unit 16 may include an even number of output pulleys for allowing the output pulleys 30, 32 to rotate in opposite directions. It is to be noted that the drive unit 16 may also include a suitable number of output pulleys for performing the same rotation of the first and second platters in opposite directions.

Now referring to FIG. 2, there is shown a schematic cross section of the vibration-reduced turntable 10 shown in FIG. 1. As can be seen, the first and second platters 12, 14 are mounted to their corresponding support plates 18, 20 by a corresponding bearing 40, 42. The illustrated example also shows that the second platter 14 is further connected to the underside of the top support plate 18 by bearing 44. This bearing 44 receives a spindle 46 upwardly projecting from the center of the second platter 14. The bearing 44 supports no weight or minimal weight and is provided to keep first and second platters 12, 14 parallel at all times; i.e., the first and the second platters 12, 14 are in parallel planes. It thus minimizes the relative tilting movement between the first and second platters 12, 14 that can be caused by the tolerance stack of the platter bearings 40, 42.

Moreover, the vibration-reduced turntable 10 can reduce minute vibrations when playing a record that can have a frequency in the audible range, thus vibrations that can be sensed by the needle reading the vinyl record. Reducing these vibrations can thus result in a much higher quality sound output.

Figure 3:
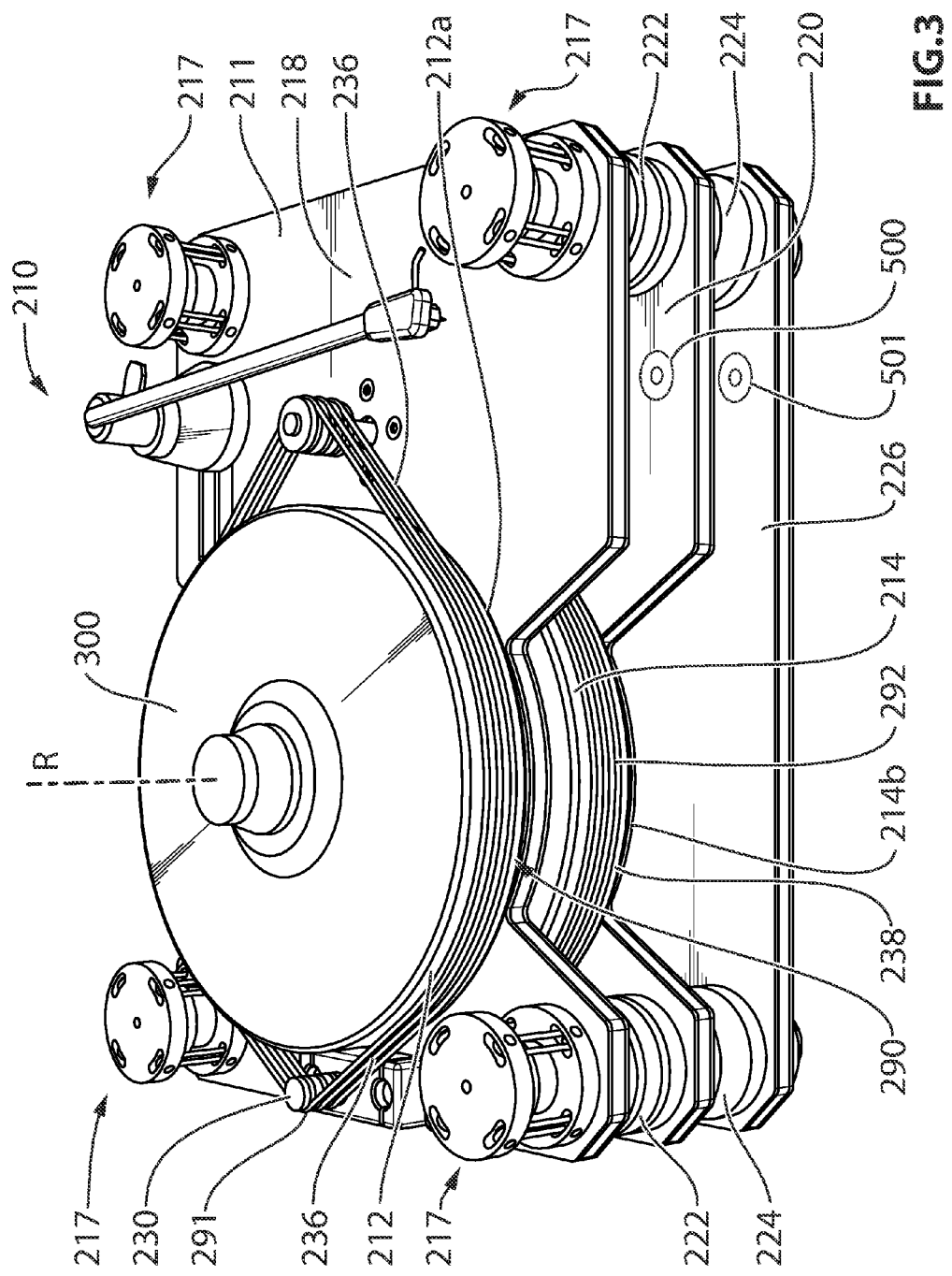
FIG. 3 is a perspective view of a vibration-reduced turntable according to another embodiment.
Figure 4:
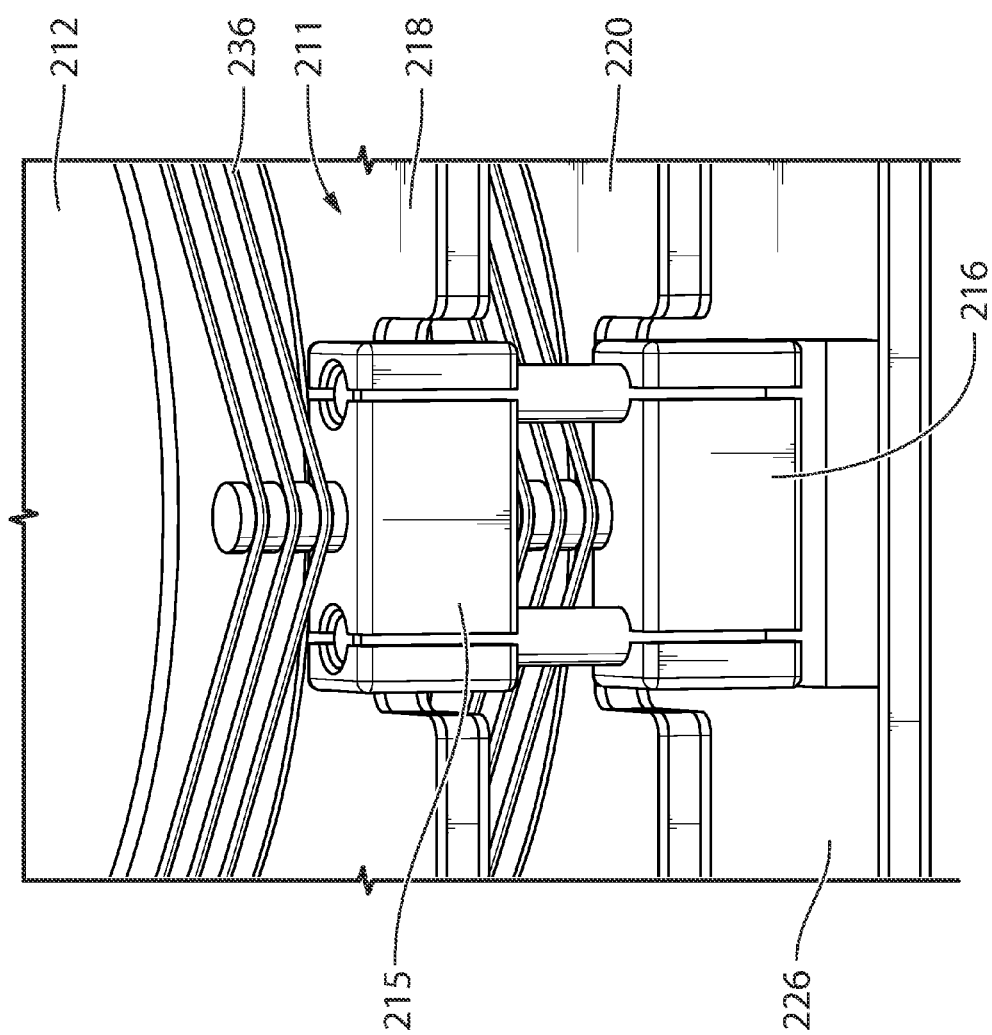
FIG. 4 is a closed-up view of the first platter of the vibration-reduced turntable of FIG. 3.

According to another embodiment and referring now to FIGS. 3 and 4, there is shown a perspective view of a vibration-reduced turntable 210 to receive a disc 300. The vibration-reduced turntable 210 is adapted to receive a disc. The vibration-reduced turntable 210 comprises a frame 211. The vibration-reduced turntable 210 also includes a first platter 212 mounted on the frame 211 and for receiving the disc 300. The first platter 212 is for rotation in a first direction. The vibration-reduced turntable 210 also includes a second platter 214 mounted on one of: the frame 211 and the first platter 212. The second platter 214 is for rotation in a second direction, opposite to the first direction. The vibration-reduced turntable 210 also includes a suspension system 217 supporting the frame 211 for reducing vibrations on the disc 300 received by the first platter 212 and for reducing vibrations of the frame 211.

According to this embodiment, the first platter 212 and the second platter 214 are concentric about the axis R and the first platter 212 and the second platter 214 are in parallel planes.

According to this embodiment, the vibration-reduced turntable 210 further comprises a base 226 on which the suspension system 217 is mounted, and as shown in FIG. 3. The frame 211 further comprises a support plate 218 for supporting at least one of the first platter 212 and the second platter 214. In the vibration-reduced turntable 210 of FIG. 3, the support plate 218 comprises two support plates 218, 220, each one of the two support plates 218, 220 for supporting a respective one of the first platter 212 and the second platter 214.

According to other embodiment, a shape of the first platter 212 and a shape of the second platter 214 may be included in the group consisting of: a disk-shape, a polygonal-shape, a square-shape, an oval-shape, a longitudinal-shape, an irregular-shape, a regular-shape or any combination thereof. It is to be noted that the first platter 212 and the second platter 214 may be of a different shape.

Still referring to FIGS. 3 and 4, the vibration-reduced turntable 210 further comprises drive units 215, 216 (FIG. 4) for rotating the first platter 212 in the first direction and the second platter 214 in the second direction. The drive units 215, 216 also include an electric motor (not shown). The drive units 215, 216 may also comprise two electric motors, a first one of the two electric motors for rotating the first platter 212 in the first direction and a second one of the two electric motors for rotating the second platter 214 in the second direction.

According to an embodiment, one of the drive units 215, 216 is mounted to the base 226. The drive unit(s) 215 and/or 216 comprises a first drivebelt 236 and a second drivebelt 238, where the first platter 212 and the second platter 214 are driven into rotation using respectively the first drivebelt 236 and the second drivebelt 238. The first drivebelt 236 has a first end 290 set around the first platter 212 and another first end 291 set around a first output pulley 230 of the drive unit 215 and the second drivebelt 238 has a second end 292 set around the second platter 214 and another second 293 end set around a second output pulley (not shown) of the drive unit 216.

Still referring to FIG. 3, the first platter 212 is above the second platter 214. However, the first platter 212 may be underneath or aside the second platter 214, positioned in a way that the rotation of the second platter 214 in the second direction cancels the vibrations provided from the rotation of the first platter 212 in the opposite first direction.

According to an embodiment, the vibration-reduced turntable 210 is for installation on a surface and the suspension system 217 further comprises a post 222 and a biasing device (not shown) and where the biasing device comprises a spring. The suspension system 217 may further comprises a suspension arm unit 224 and when one of the post 222 and the suspension arm unit 224 is mounted to the frame 211, the other one of the post 222 and the suspension arm unit 224 is for interfacing with the surface. Also, the biasing device is the interface between a post 222 and a suspension arm unit 224. The post 222 may includes at least two posts 222 and the suspension arm unit 224 may includes at least two suspension arm units 224, each suspension arm unit 224 corresponding to one of the posts 222. Referring to FIGS. 3 and 4, the post 222 includes four posts 222 and the suspension arm unit 224 includes four suspension arm units 224, each suspension arm unit 224 corresponding to one of the posts 222.

According to an embodiment, the first platter 212 is in suspension, using an elastic device, relative to the second platter 214, thereby reducing the vibrations from an external environment.

It is also to be noted that the first and second platters 212, 214 may rotate on different shafts (not shown) around the rotation axis R. The first platter 212 receives the record to be played and the first and second platters 212, 214 rotate in opposite direction when the drive units 215, 216 are powered.

As shown in FIG. 3, the vibration-reduced turntable 210 includes the two identical disk-shaped platters 212, 214 respectively corresponding to the first platter 212 and the second platter 214 that are concentrically-disposed and that are driven into rotation around the rotation axis R.

Still referring to FIG. 3 and according to another embodiment, the support plates 218, 220 and the base 226 may integrate a level indicator, as indicated by reference numeral 500 and 501. According to FIG. 3, the level indicators 500 and 501 includes an air drop in a liquid, as well know in the prior art, for leveling the base 226 and/or the support plates 218, 220.

As shown in FIG. 4, the first platter 212 is driven into rotation around the rotation axis R by a separate drive unit 215 located on the side of the first platter 212. The drive unit 216 is mounted to the base.

Additionally, the first and second platters 212, 214 are driven into rotation using corresponding drivebelts 236, 238. The first drivebelt 236 has one first end set 290 around a drive surface of a portion 212a (see FIG. 3) juxtaposed under the top first platter 212 and another first end 291 set around the first output pulley 230 of the drive unit 215. Likewise, the second drivebelt 238 has one second end 292 set around a drive surface of a portion 214a juxtaposed above the main portion of the bottom second platter 214 and another second end set around the second output pulley (not shown) of the drive unit 216. Alternatively, the drive surface on each platter 212, 214 can also be the side surface of the larger-diameter portions. Each output pulley 230, (not shown) is substantially disposed in the same horizontal plane than that of the corresponding platter portion 212a, 214a.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A vibration-reduced turntable adapted to receive a disc, the vibration-reduced turntable comprising:
   a frame;
   a first platter mounted on the frame and for receiving the disc, the first platter for rotation in a first direction;
   a second platter mounted on one of: the frame and the first platter, the second platter for rotation in a second direction; and
   a suspension system supporting the frame for reducing vibrations on the disc received by the first platter and for reducing vibrations of the frame.

2. The vibration-reduced turntable of claim 1, wherein the first platter and the second platter are concentric.

3. The vibration-reduced turntable of claim 2, wherein the first platter and the second platter are in parallel planes.

4. The vibration-reduced turntable of claim 1, further comprising a base on which the suspension system is mounted.

5. The vibration-reduced turntable of claim 1, wherein the frame further comprises a support plate for supporting at least one of the first platter and the second platter.

6. The vibration-reduced turntable of claim 5, wherein the support plate comprises two support plates, each one of the two support plates for supporting a respective one of the first platter and the second platter.

7. The vibration-reduced turntable of claim 1, wherein a shape of the first platter and a shape of the second platter are included in the group consisting of: a disk-shape, a polygonal-shape, a square-shape, an oval-shape, a longitudinal-shape, an irregular-shape, a regular-shape or a combination thereof.

8. The vibration-reduced turntable of claim 7, wherein the first platter and the second platter are of a different shape.

9. The vibration-reduced turntable of claim 1, further comprising a drive unit for rotating the first platter in the first direction and the second platter in the second direction.

10. The vibration-reduced turntable of claim 9, wherein the drive unit comprises an electric motor.

11. The vibration-reduced turntable of claim 10, wherein the drive unit comprises two electric motors, a first one of the two electric motors for rotating the first platter in the first direction and a second one of the two electric motors for rotating the second platter in the second direction.

12. The vibration-reduced turntable of claim 9, further comprising a base and wherein the drive unit is mounted to the base.

13. The vibration-reduced turntable of claim 9, wherein the drive unit comprises a first drivebelt and a second drivebelt, wherein the first platter and the second platter are driven into rotation using respectively the first drivebelt and the second drivebelt.

14. The vibration-reduced turntable of claim 13, wherein the first drivebelt has a first end set around the first platter and another first end set around a first output pulley of the drive unit and the second drivebelt has a second end set around the second platter and another second end set around a second output pulley of the drive unit.

15. The vibration-reduced turntable of claim 1, wherein the first platter is above the second platter.

16. The vibration-reduced turntable of claim 1, wherein the vibration-reduced turntable is for installation on a surface and wherein the suspension system further comprises a post and a biasing device.

17. The vibration-reduced turntable of claim 16, wherein the biasing device comprises a spring.

18. The vibration-reduced turntable of claim 16, wherein the suspension system further comprises a suspension arm unit and wherein one of the post and the suspension arm unit is mounted to the frame while the other one of: the post and the suspension arm unit is for interfacing with the surface and further wherein the biasing device is the interface between the post and the suspension arm unit.

19. The vibration-reduced turntable of claim 18, wherein the post comprises at least two posts and the suspension arm unit comprises at least two suspension arm units, each suspension arm unit corresponding to one of the at least two posts.

20. The vibration-reduced turntable of claim 19, wherein the biasing device comprises an elastic ring.

* * * * *